(12) United States Patent
Ahn et al.

(10) Patent No.: US 10,705,278 B2
(45) Date of Patent: Jul. 7, 2020

(54) BACKLIGHT UNIT AND DISPLAY DEVICE INCLUDING THE SAME

(71) Applicant: SAMSUNG DISPLAY CO., LTD., Yongin-si, Gyeonggi-Do (KR)

(72) Inventors: Jeaheon Ahn, Cheonan-si (KR); Cheonjae Maeng, Suwon-si (KR); Dongil Son, Seoul (KR); Taewoo Lim, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 16/181,468

(22) Filed: Nov. 6, 2018

(65) Prior Publication Data

US 2019/0212486 A1    Jul. 11, 2019

(30) Foreign Application Priority Data

Jan. 8, 2018   (KR) .......................... 10-2018-0002328

(51) Int. Cl.
*F21V 8/00*      (2006.01)
*G02B 6/00*      (2006.01)
*G02F 1/13357*   (2006.01)

(52) U.S. Cl.
CPC ........... *G02B 6/0026* (2013.01); *G02B 6/005* (2013.01); *G02B 6/0031* (2013.01); *G02B 6/0055* (2013.01); *G02B 6/0058* (2013.01); *G02B 6/0073* (2013.01); *G02F 1/1336* (2013.01)

(58) Field of Classification Search
CPC ........ G02B 6/0055; G02B 6/0035; F21V 7/30
See application file for complete search history.

(56) References Cited

U.S. PATENT DOCUMENTS

| 2012/0113672 | A1* | 5/2012 | Dubrow ............... G02B 6/0073 362/602 |
| 2014/0022819 | A1* | 1/2014 | Oh ......................... G02B 6/005 362/607 |
| 2014/0063846 | A1* | 3/2014 | Lu ........................ G02B 6/0031 362/609 |
| 2017/0159910 | A1* | 6/2017 | Seo ............................ F21V 9/30 |
| 2017/0322436 | A1* | 11/2017 | Yamada .................... C08F 2/48 |
| 2018/0299610 | A1* | 10/2018 | Saito ........................ G02B 5/20 |
| 2019/0065816 | A1* | 2/2019 | Reinhold ............. G02B 6/0031 |

* cited by examiner

*Primary Examiner* — Alexander K Garlen
*Assistant Examiner* — Eric T Eide
(74) *Attorney, Agent, or Firm* — F. Chau & Associates, LLC (57) ABSTRACT

A backlight unit may include a light source, a light guide plate configured to guide light emitted from the light source, a light conversion layer on the light guide plate, and a reflective pattern layer between the light guide plate and the light conversion layer, the reflective pattern layer including a plurality of holes. The light conversion layer absorbs at least a portion of the light emitted from the light source at the first predetermined wavelength and generates light having a second predetermined wavelength different than the first predetermined wavelength. A reflective layer may reflect the light having the second predetermined wavelength toward a display panel.

16 Claims, 7 Drawing Sheets

BACKLIGHT UNIT AND DISPLAY DEVICE INCLUDING THE SAME

CROSS-REFERENCE TO RELATED APPLICATION(S)

This application claims priority under 35 USC § 119 from Korean Patent Application No. 10-2018-0002328, filed on Jan. 8, 2018 in the Korean Intellectual Property Office (KIPO), the entire disclosure of which is incorporated by reference herein.

TECHNICAL FIELD

Embodiments of the inventive concept relate to a display device and ways to eliminate scattering patterns in a backlight unit. More particularly, embodiments of the inventive concept relate to the backlight unit including a reflective pattern layer and a display device including the backlight unit.

DISCUSSION OF THE RELATED ART

A liquid crystal display (LCD) is one of the most widely used display devices today because of their display quality, relatively thin screen size, and efficiency in terms of power usage. Generally, an LCD displays an image by holding a liquid crystal material between an upper substrate formed with common electrodes, color filters, and the like, and a lower substrate formed with thin film transistors, pixel electrodes, and the like, and applying different voltages to the pixel and common electrodes to generate an electric field. Application of different voltages to the pixel and common electrodes changes the arrangement of liquid crystal molecules, and thereby adjusts the transmittance of light.

An LCD panel of the LCD is in itself a non-emissive type of light receiving element. Hence, an LCD generally includes a backlight unit for supplying light to the LCD panel that, for example, may serve as a source of light that may be reflected off liquid crystal material, and may provide a display having uniform brightness.

With regard to a backlight unit for an LCD panel, a cold cathode fluorescent lamp (CCFL) has been widely used, because it consumes little power and provides bright white light. Recently, a light emitting diode (LED) has been gaining popularity for use in a backlight unit because LEDs have superior color reproducibility, a longer lifespan, and less power consumption than CCFLs.

Recently, to increase efficiency of light provided to the LCD panel, a light conversion member including quantum dots has been used. The light conversion member may convert light having a predetermined color, and generated from a light source, into white light. For example, the light conversion member may convert blue light generated from the light source into white light.

The white light generated by the light conversion member may be provided to the LCD panel, and pixels of the LCD panel may display an image by using the white light provided from the light conversion member.

SUMMARY

An embodiment of the inventive concept is to provide a backlight unit providing light without scattering patterns.

An embodiment of the inventive concept is to provide a display device including a backlight unit providing light for uniform display without using scattering patterns.

Accordingly, a backlight unit according to an embodiment inventive concept may include a light source that emits light having a first predetermined wavelength; a light guide plate configured to guide light emitted from the light source; a light conversion layer disposed on the light guide plate; and a reflective pattern layer arranged between the light guide plate and the light conversion layer in which light traveling in the light guide plate is reflected by the reflective pattern layer, the reflective pattern layer including a plurality of holes, and wherein the light conversion layer absorbs at least a portion of the light emitted from the light source at the first predetermined wavelength and generates light having a second predetermined wavelength different than the first predetermined wavelength.

In an embodiment of the inventive concept, the light conversion layer includes a plurality of quantum dots arranged in a resin.

The plurality of quantum dots may include at least first quantum dots and second quantum dots being respectively sized to convert the light emitted from the light source at the first predetermined wavelength that enters the light conversion layer into the second predetermined wavelength or a third predetermined wavelength, respectively.

In an embodiment of the inventive concept, the light emitted from the light source may be reflected by the reflective pattern layer.

In an embodiment of the inventive concept, the light guided by the light guide plate may pass through the plurality of holes of the reflective pattern layer.

In an embodiment of the inventive concept, the plurality of holes may be arranged as a matrix form in a plan view.

In an embodiment of the inventive concept, the reflective pattern layer may include aluminum (Al).

In an embodiment of the inventive concept, the light conversion layer may be configured to convert incident light that passes through the plurality of holes of the reflective pattern layer from the fight guide plate and has a first wavelength converted into light that has a second wavelength.

In an embodiment of the inventive concept, the backlight unit may further include a reflective layer. The light conversion layer may be between the reflective pattern layer and the reflective layer.

In an embodiment of the inventive concept, the light conversion layer may be configured to convert incident light that passes through the plurality of holes of the reflective pattern layer from the light guide plate and has a first wavelength into converted light that has a second wavelength. The converted light may be reflected by the reflective layer and passes through the plurality of holes of the reflective pattern layer.

In an embodiment of the inventive concept, the backlight unit may further include a sealing member covering a side portion of the light conversion layer.

In an embodiment of the inventive concept, the backlight unit may further include a barrier layer between the light conversion layer and the reflective pattern layer.

A display device according to an embodiment of the inventive concept may include a display panel configured to display an image; and a backlight unit configured to provide light to the display panel, wherein the backlight unit includes: a light source that emits light having a first predetermined wavelength; a light guide plate configured to guide light emitted from the light source; a light conversion layer disposed on the light guide plate that absorbs at least a portion of the light emitted from the light source at the first predetermined wavelength and generates light having a second predetermined wavelength different than the first predetermined wavelength. A reflective pattern layer may be arranged between the light guide plate and the light conversion layer, in which light traveling in the light guide plate is reflected by the reflective pattern layer, and wherein the reflective pattern layer includes a plurality of holes arranged in a pattern.

In an embodiment of the inventive concept, the light emitted from the light source may be reflected by the reflective pattern layer.

In an embodiment of the inventive concept, the light guided by the light guide plate may pass through the plurality of holes of the reflective pattern layer.

In an embodiment of the inventive concept, the plurality of holes may be arranged as a matrix form in a plan view.

In an embodiment of the inventive concept, the light conversion layer may be between the display panel and the light guide plate.

In an embodiment of the inventive concept, the light conversion layer may be configured to convert incident light that passes through the plurality of holes of the reflective pattern layer from the light guide plate and has a first wavelength into converted light that has a second wavelength. The converted light may be provided to the display panel.

In an embodiment of the inventive concept, the light guide plate may be between the display panel and the light conversion layer.

In an embodiment of the inventive concept, the backlight unit may further include a reflective layer. The light conversion layer may be between the reflective pattern layer and the reflective layer.

In an embodiment of the inventive concept, the light conversion layer may be configured to convert incident light that passes through the plurality of holes of the reflective pattern layer from the light guide plate and has a first wavelength into converted light that has a second wavelength. The converted light may be reflected by the reflective layer and provided to the display panel by passing through the plurality of holes of the reflective pattern layer.

In an embodiment of the inventive concept, the backlight unit may further include a sealing member covering a side portion of the light conversion layer.

The backlight unit according to some embodiments of the inventive concept may include the reflective pattern layer including the plurality of holes between the light guide plate and the light conversion layer. Accordingly, the backlight unit may provide light without the scattering patterns. In addition, the backlight according to some embodiments of the inventive concept may provide light without a low refractive layer disposed on the light guide plate.

The backlight unit of the display device according to some embodiments of the inventive concept may include the reflective pattern layer including the plurality of holes between the light guide plate and the light conversion layer. Accordingly, the backlight unit may provide light to the display panel without the scattering patterns.

BRIEF DESCRIPTION OF THE DRAWINGS

Illustrative, non-limiting embodiments of the inventive concept will be better appreciated by a person of ordinary skill in the art from the following detailed description taken in conjunction with the accompanying drawings.

DETAILED DESCRIPTION OF THE EMBODIMENTS

Hereinafter, backlight units and display devices including the backlight units in accordance with embodiments of the inventive concept will be explained in detail with reference to the accompanying drawings. A person of ordinary skill in the art should understand and appreciate that the inventive concept is not limited to the embodiments shown and described herein.

Hereinafter, a display device according to an embodiment of the inventive concept will be described with reference to FIGS. 1, 2, 3, and 4.

Figure 1:
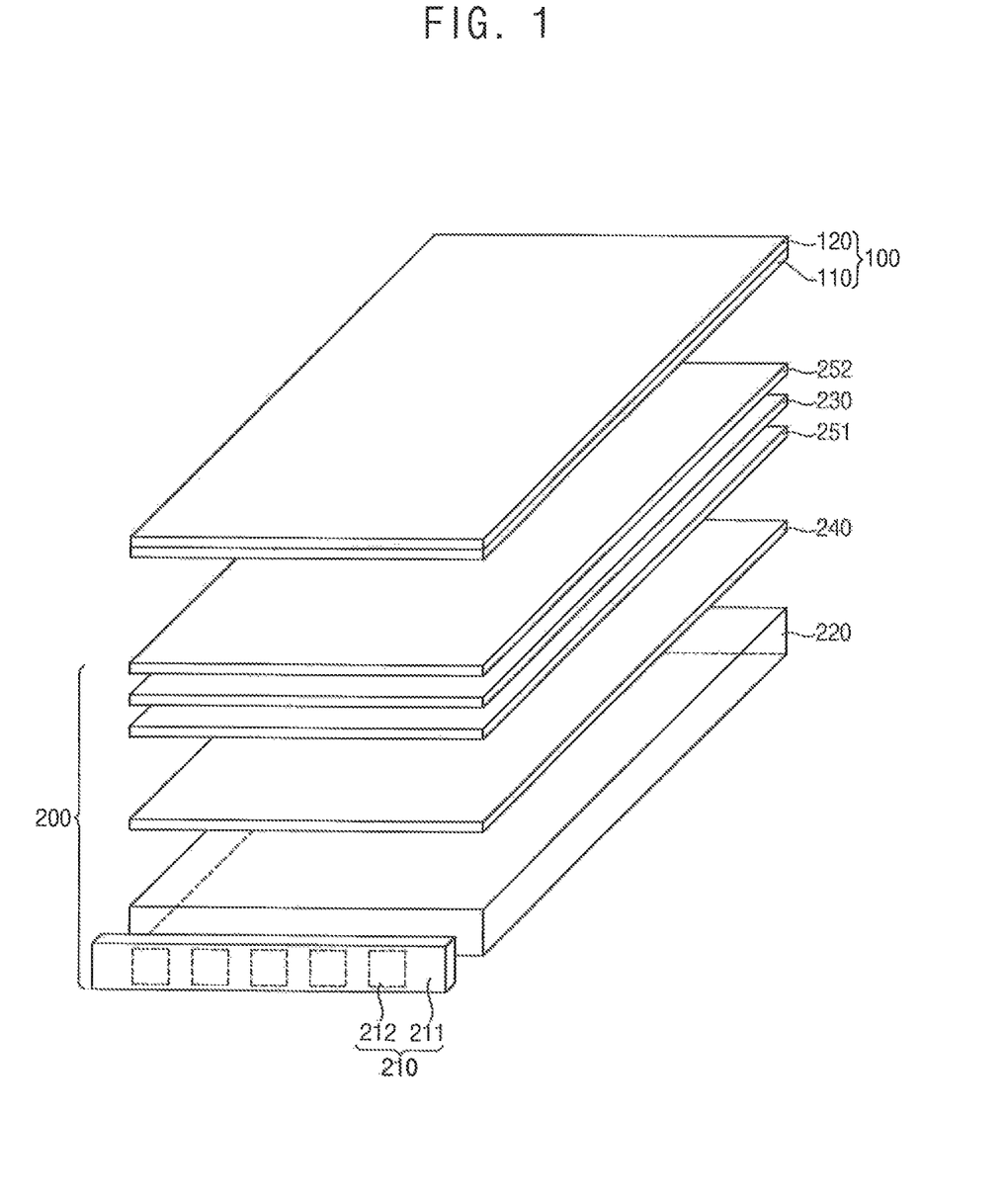
FIG. 1 is an exploded perspective view illustrating a display device according to an embodiment of the inventive concept.

FIG. 1 is an exploded perspective view illustrating a display device according to an embodiment of the inventive concept.

Referring to FIG. 1, a display device according to an embodiment of the inventive concept may include a display panel 100 and a backlight unit 200.

The display panel 100 may display an image. In the present embodiment, the display panel 100 may be, for example, a liquid crystal display (LCD) panel.

The display panel 100 may include a first substrate 110 and a second substrate 120. The first substrate 110 may include a plurality of pixels that display images by using light provided from the backlight unit 200. The second substrate 120 is disposed on the first substrate 110, and the second substrate 120 may face the first substrate 110. The display panel 100 may include a liquid crystal layer (not illustrated) interposed between the first substrate 110 and the second substrate 120.

The backlight unit 200 may be located under the display panel 100. The backlight unit 200 may provide light to the display panel 100. The backlight unit 200 may include a light source 210, a light guide plate 220, a light conversion layer 230, a reflective pattern layer 240, and first barrier layer 251 and second barrier layer 252.

Figure 2:
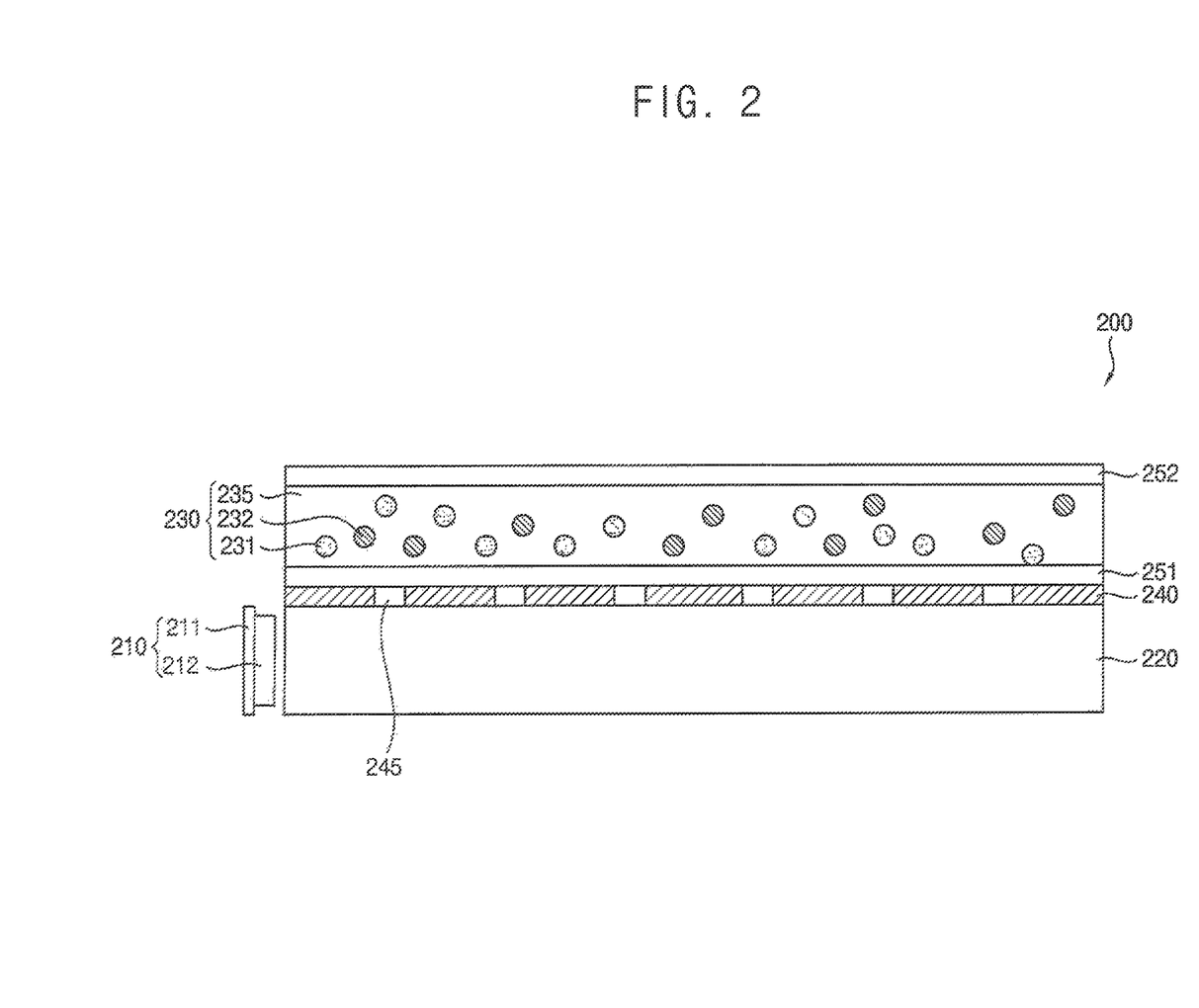
FIG. 2 is a cross-sectional view illustrating a backlight unit in FIG. 1.

FIG. 2 is a cross-sectional view illustrating the backlight unit shown in FIG. 1.

Referring now to FIGS. 1 and 2, the light source 210 may be located at a side of the light guide plate 220. In FIG. 1, the light source has approximately a same height and width as the light guide plate 220 so as to be aligned with the light guide plate 220. However, a person of ordinary skill in the art should understand that embodiments of the inventive concept are not limited to structure shown and described in FIGS. 1 and 2.

The light source 210 may generate light, and may supply the light to the light guide plate 220. The light source 210 may generate light having a predetermined wavelength. For example, the light source 210 may generate light having a wavelength corresponding to blue light. However, the predetermined wavelength of light is not limited to blue, and the light source 210 may be capable of generating light of more than one predetermined wavelength.

The light source 210 may include a circuit board 211 and a plurality of light emitting elements 212.

As shown in FIGS. 1 and 2, the circuit board 211 may extend along the side of the light guide plate 220.

The light emitting elements 212 may be disposed on the circuit board 211. The light emitting elements 212 may be disposed in a lengthwise direction of the circuit board 211 with a uniform distance in between. The light emitting elements 212 may face the side of the light guide plate 220 and may travel through the light guide plate 220.

The light emitting elements 212 may generate light having a predetermined wavelength. For example, the light emitting elements 212 may generate light having a wavelength corresponding to blue light. In this embodiment of the inventive concept, each of the light emitting elements 212 may be a blue light emitting diode (LED).

The light guide plate 220 may guide light that is emitted from the light source 210. The light guide plate 220 may guide light provided from the light source 210 to an upper direction. At least some of the light guided to an upper direction may pass through holes 245 in the reflective pattern layer 240 (as shown in FIG. 2).

The light conversion layer 230 may be disposed on the light guide plate 220. Specifically, the light conversion layer 230 may be located between the light guide plate 220 and the display panel 100. In other words, the light conversion layer 230 may be located over the light guide plate 220. There may also be other layers between the light conversion layer 230 and the light guide plate.

Incident light may be transmitted from the light guide plate 220 to the light conversion layer 230. The incident light may be light Which is generated by the light source 210 and then guided by the light guide plate 220 to the light conversion layer 230. The light conversion layer 230 may convert the incident light into converted light.

The light conversion layer 230 may convert a wavelength of the incident light. The light conversion layer 230 may convert the incident light having a predetermined wavelength into the converted light having a wavelength different from the predetermined wavelength. For example, the light conversion layer 230 may convert the incident light having a wavelength corresponding to blue light into the converted light having a wavelength corresponding to red light or green light. A person of ordinary skill in the art should understand and appreciate that wavelengths anywhere on the visible spectrum are within the embodiments of the inventive concept.

As shown in FIG. 2, the light conversion layer 230 may include a resin 235, and a plurality of first quantum dots 231 and a plurality of second quantum dots 232 which are accommodated inside the resin 235.

The resin 235 may absorb oxygen and moisture from the outside.

The first quantum dots 231 may generate the converted light by absorbing the incident light. For example, quantum dots, e.g., nanocrystal phosphors, can convert light to virtually any color in the visible spectrum based on their size. For example, the first quantum dots 231 may generate the converted light having a wavelength different from the wavelength of the incident light. In addition, the first quantum dots 231 may absorb the incident light having a wavelength corresponding to blue light, and may generate the converted light having a wavelength corresponding to red light. In general, quantum dots may emit light of specific frequencies based on at least one of the dots' size, shape or material. Thus, for example, the first quantum dots 231 may be a different shape, size, or made from a different material than the second quantum dots 232, and each will respectively emit light of a certain frequency based on light (or electricity) being applied.

The second quantum dots 232 may generate the converted light by absorbing the incident light. The second quantum dots 232 may generate the converted light having a wavelength different from the wavelength of the incident light. For example, the second quantum dots 232 may absorb the incident light having a wavelength corresponding to blue light, and may generate the converted light having a wavelength corresponding to green light. Thus by arranging quantum dots designed to generate converted light having a wavelength corresponding to respectfully different colors, the various color outputs may be achieved.

Figure 3:
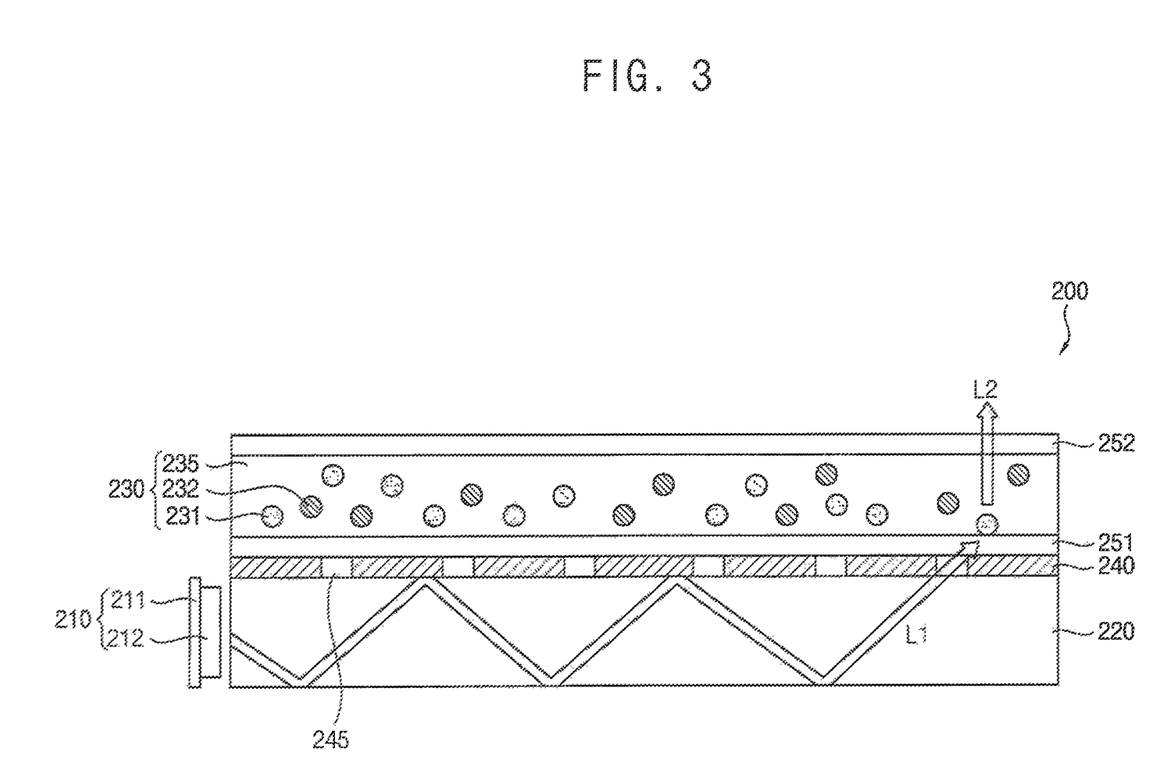
FIG. 3 is a cross-sectional view illustrating a light emission from the backlight unit in FIG. 2.

With continued reference to FIG. 2, the reflective pattern layer 240 may be disposed between the light guide plate 220 and the light conversion layer 230. For example, light emitted from the light source 210 may be reflected by the reflective pattern layer 240 at angle, such as shown in FIG. 3. Specifically, light emitted from the light source 210 and then guided by the light guide plate 220 may move forward inside the light guide plate 220 by being reflected by a surface (e.g., a lower surface) of the reflective pattern layer 240.

The reflective pattern layer 240 may include metal. For example, the reflective pattern layer 240 may include aluminum (Al). However, a material of the reflective pattern layer 240 is not limited thereto, and the reflective pattern layer 240 may include a material that may reflect light, such as metal other than aluminum, a nitride thereof, a mixture thereof, etc. In addition, the reflective pattern layer may be a nonmetal reflective material. In addition, for example, a reflective coating can be used. Also it is possible to use a uniformity tape in a light guide plate.

Figure 4:
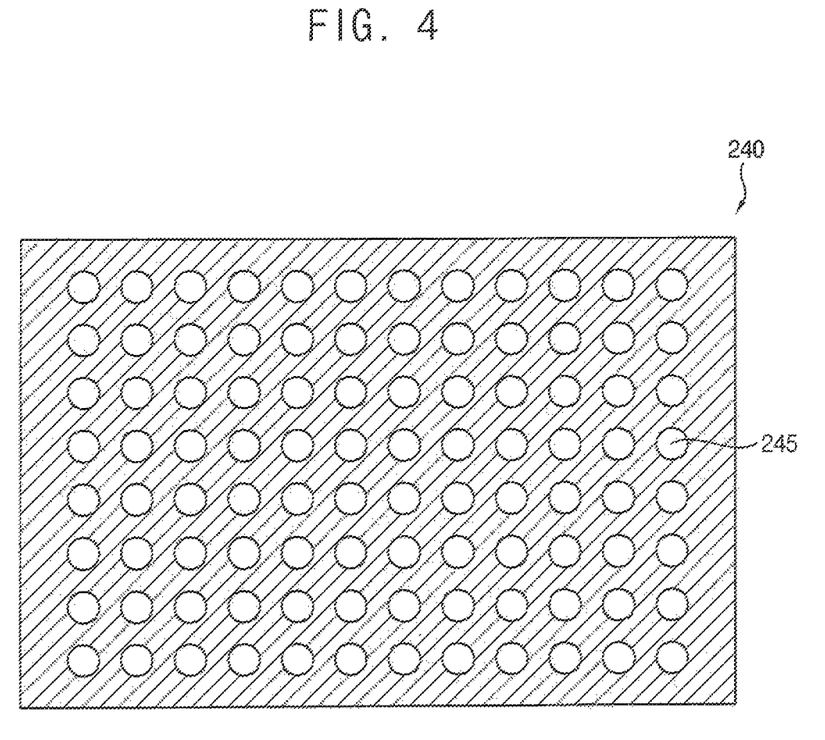
FIG. 4 is a plan view illustrating a reflective pattern layer in FIG. 2.

The reflective pattern layer 240 may include a plurality of holes 245, such as shown in FIGS. 2, 3 and 4.

FIG. 3 shows that light guided by the light guide plate 220 may pass through the holes 245 of the reflective pattern layer 240. Specifically, light moving forward inside the light guide plate 220 by being reflected by the surface (e.g., the lower surface) of the reflective pattern layer 240 may pass through the holes 245 of the reflective pattern layer 240, and then may be provided to the light conversion layer 230.

FIG. 3 is a cross-sectional view illustrating a light emission from the backlight unit in FIG. 2.

Referring to FIG. 3, a first light L1 emitted from the light source 210 may move forward inside the light guide plate 220, and may be converted into a second light L2 at the light conversion layer 230. The second light L2 may be provided to the display panel 100 located over the backlight unit 200.

The first light L1 may have a first wavelength, and the first wavelength may be a wavelength corresponding to, for example, blue light. The first light L1 emitted from the light source 210 may be guided by the light guide plate 220, and may be provided to the light conversion layer 230 by passing through the hole 245 of the reflective pattern layer 240. The first light L1 incident into the light conversion layer 230 may be absorbed in the first quantum dot 231, and the first quantum dot 231 may convert the first light L1 into the second light L2. IT should also be understood and appreciated by a person of ordinary skill in the art that with reference to FIG. 3, as the light reflects off lower surface of the light guide plate 220 and then off the reflective pattern layer 240, there may be some scattering and only a portion of the light may enter a particular hole 245 to be subsequently absorbed by the first quantum dot 231 or the second quantum dot 232.

The second light L2 may have a second wavelength different from the first wavelength, and the second wavelength may be a wavelength corresponding to red light. The second light L2 may move forward in an upper direction of the light conversion layer 230, and may be provided to the display panel 100. FIG. 3 illustrates that the first light L1 is absorbed in the first quantum dot 231. However, the present embodiment of the inventive concept is not limited thereto, and the first light L1 may be absorbed in the second quantum dot 232. In this case, the second light L2 may have a wavelength corresponding to green light. A person of ordinary skill in the art should also understand and appreciate there can be third quantum dots (not shown), etc.

FIG. 4 is a plan view illustrating a reflective pattern layer in FIG. 2.

Referring to FIG. 4, the holes 245 of the reflective pattern layer 240 may be arranged as a matrix form in a plan view. The holes 245 may be disposed in a row direction and/or a column direction with a uniform distance in between.

In a conventional backlight unit, a light guide plate may include scattering patterns, and a low refractive layer may be disposed on the light guide plate. A low refractive layer is used in the art, for example, to reduce glare from an external source without causing significant deterioration of an image being displayed. Light may move forward inside the light guide plate via the low refractive layer, and the light may be provided to a display panel by the scattering patterns. However, a material forming the low refractive layer disposed on the light guide plate may be relatively expensive, and an additional lamination process, etc. may be used to form the scattering patterns inside the light guide plate. However, the backlight unit 200 according to the present embodiment of the inventive concept may include the reflective pattern layer 240 instead of the conventional low refractive layer, and the conventional scattering patterns may not be utilized. Accordingly, a manufacturing cost and a manufacturing time of the backlight unit 200 may be reduced.

For example, in some embodiments of the inventive concept, the backlight unit does not include a low refractive layer, yet provides functionality equal or better than backlight units having the low refractive layer, and does so at a reduced cost of manufacture. In addition, a person of ordinary skill in the art understands that a "low refractive layer" a layer having a low refractive index. In one non-limiting example, a low refractive index may be a range of about 1.2 to 1.3.

Referring back to FIGS. 1 and 2, the first barrier layer 251 and the second barrier layer 252 may be disposed on the light conversion layer 230. As shown in FIG. 2, the light conversion layer 230 is sandwiched between the first barrier layer 251 and the second barrier layer 252. The first barrier layer 251 may be disposed between the light conversion layer 230 and the reflective pattern layer 240, and the second barrier layer 252 may be disposed between the light conversion layer 230 and the display panel 100.

The first barrier layer 251 and the second barrier layer 252 may prevent oxygen and moisture from permeating into the light conversion layer 230, and may protect the first quantum dots 231 and the second quantum dots 232 of the light conversion layer 230.

The first barrier layer 251 and the second barrier layer 252 may include an inorganic material. For example, the first barrier layer 251 and the second barrier layer 252 may include silicon oxide ($SiO_x$). However, materials of the first barrier layer 251 and the second barrier layer 252 are not limited thereto, and the first barrier layer 251 and the second barrier layer 252 may include an inorganic material other than silicon oxide and an organic material.

Hereinafter, a display device according to another embodiment of the inventive concept may be described with reference to FIGS. 5, 6, and 7.

Figure 5:
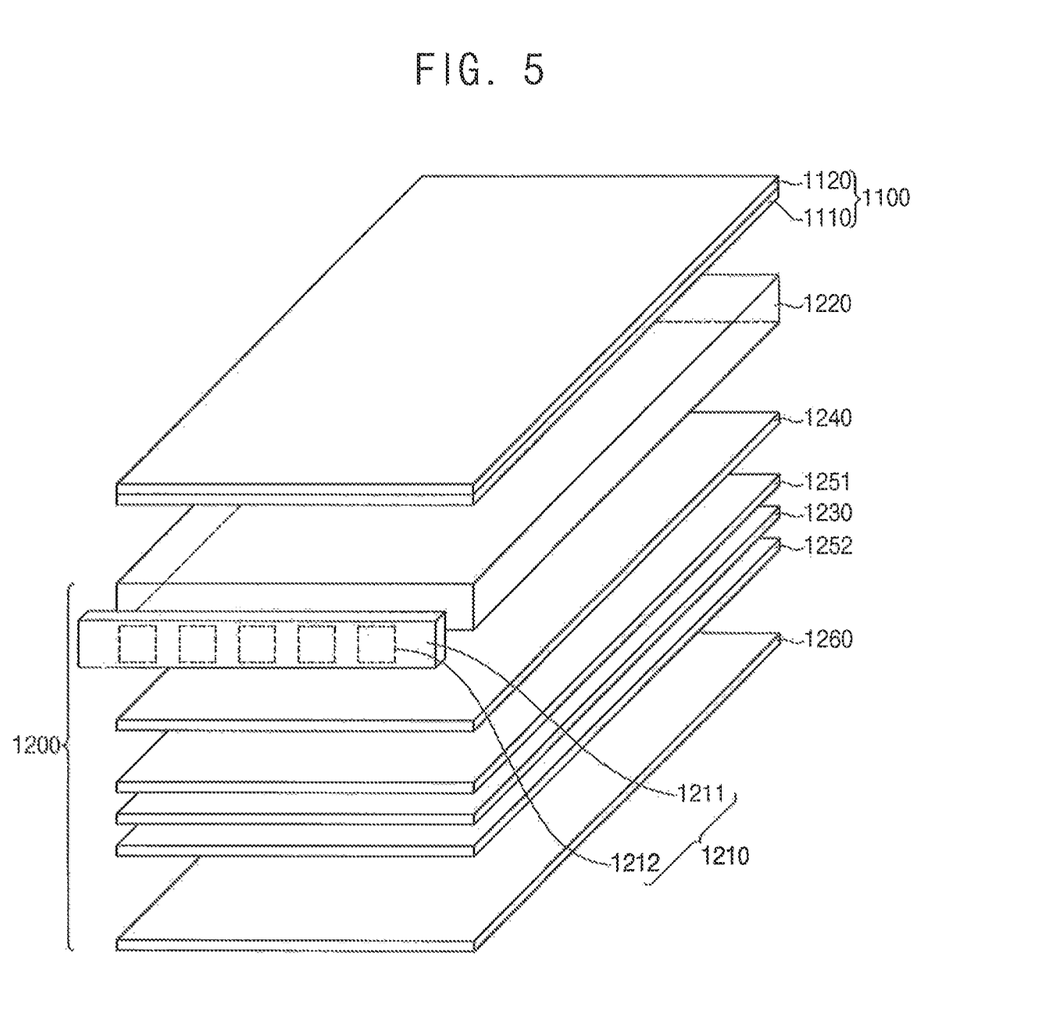
FIG. 5 is an exploded perspective view illustrating a display device according to an embodiment of the inventive concept.

FIG. 5 is an exploded perspective view illustrating a display device according to an embodiment of the inventive concept.

Referring now to FIG. 5, a display device according to an embodiment of the inventive concept may include a display panel 1100 and a backlight unit 1200.

The display panel 1100 may display an image. In the present embodiment, the display panel 1100 may be, for example, a liquid crystal display panel.

The display panel 1100 may include a first substrate 1110 and a second substrate 1120. The first substrate 1110 may include a plurality of pixels that display images by using light provided from the backlight unit 1200. The second substrate 1120 may face the first substrate 1110. The display panel 1100 may include a liquid crystal layer (not illustrated) interposed between the first substrate 1110 and the second substrate 1120.

The backlight unit 1200 may be located under the display panel 1100. The backlight unit 1200 may provide light to the display panel 1100. The backlight unit 1200 may include a light source 1210, a light guide plate 1220, a light conversion layer 1230, a reflective pattern layer 1240, first barrier layer 1251 and second barrier layer 1252, and a reflective layer 1260. The light guide plate 1220 may have the display panel disposed thereon, and the light guide plate 1220 may be disposed on the reflective pattern layer 1240 and the first barrier layer 1251, light conversion layer 1230, and second barrier layer 1252. Thus, the arrangement of the light guide plate 1220 and the other layers is different than the embodiment shown in FIG. 1.

Figure 6:
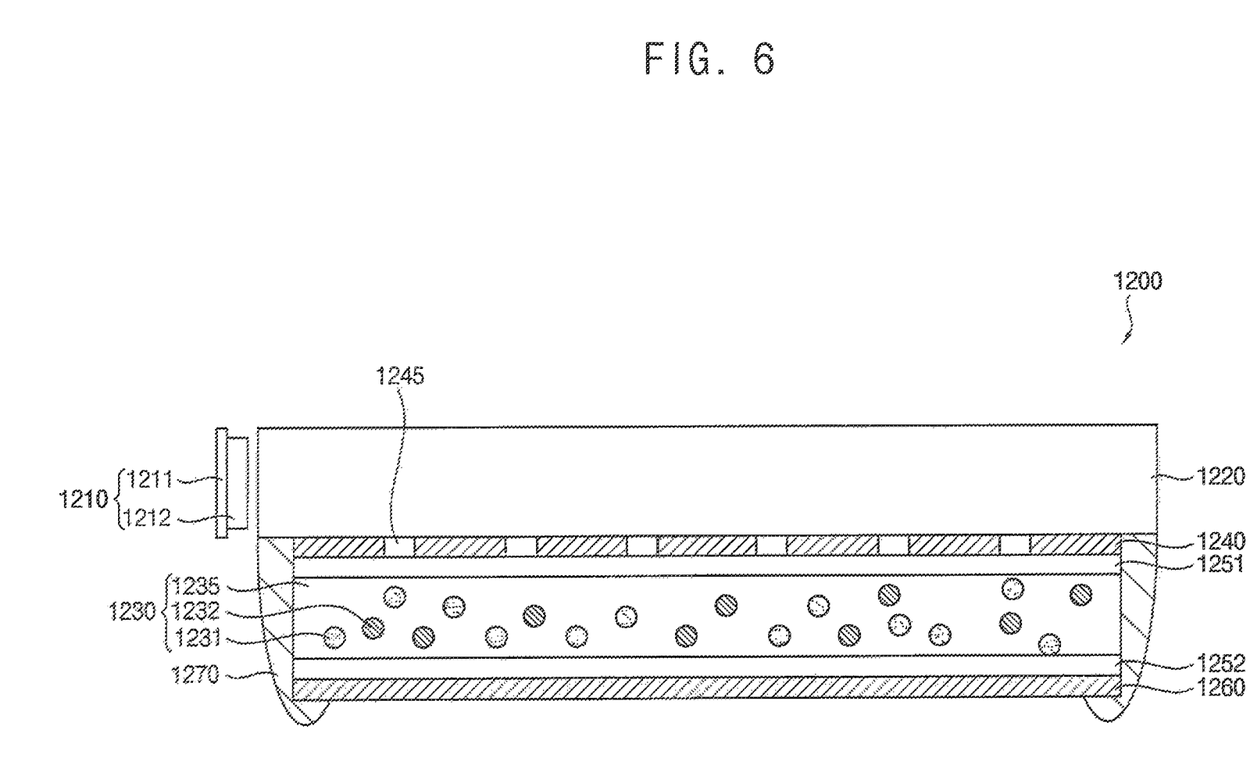
FIG. 6 is a cross-sectional view illustrating a backlight unit in FIG. 5.

FIG. 6 is a cross-sectional view illustrating a backlight unit in FIG. 5.

Referring to FIGS. 5 and 6, the light source 1210 may be located at a side of the light guide plate 1220. The light source 1210 may generate light, and may supply the light to the light guide plate 1220. The light source 1210 may generate light having a predetermined wavelength. For example, the light source 1210 may generate light having a wavelength corresponding to blue light. The generated light may travel through the light guide plate 1220, and may reflect off the reflective pattern 1260.

The light source 1210 may include a circuit board 1211 and a plurality of light emitting elements 1212.

The circuit board 1211 may extend along the side of the light guide plate 1220.

The light emitting elements 1212 may be disposed on the circuit board 1211. The light emitting elements 1212 may be disposed in a length direction of the circuit board 1211 with a uniform distance in between. The light emitting elements 1212 may face the side of the light guide plate 1220.

The light emitting elements 1212 may generate light having a predetermined wavelength. For example, the light emitting elements 1212 may generate light having a wavelength corresponding to blue light. In this case, each of the light emitting elements 1212 may be a blue light emitting diode (LED).

The light guide plate 1220 may guide light emitted from the light source 1210. The light guide plate 1220 may guide the light provided from the light source 1210 to a lower direction.

The light conversion layer 1230 may be disposed on the light guide plate 1220. Specifically, the light guide plate 1220 may be located between the light conversion layer 1230 and the display panel 1100. In other words, the light conversion layer 1230 may be located under the light guide plate 1220. In the embodiment shown in FIG. 3, the light conversion layer 230 is located over the light guide plate 220.

Incident light may be transmitted from the light guide plate 1220 to the light conversion layer 1230. The incident light may be light which is generated by the light source 1210 and then guided by the light guide plate 1220. The light conversion layer 1230 may convert the incident light into converted light.

The light conversion layer 1230 may convert a wavelength of the incident light. The light conversion layer 1230 may convert the incident light having a predetermined wavelength into the converted light having a wavelength different from the predetermined wavelength. For example, the light conversion layer 1230 may convert the incident light having a wavelength corresponding to blue light into the converted light having a wavelength corresponding to red light or green light. This conversion may be performed through the arrangement of quantum dots sized for conversion to various colors of light.

The light conversion layer 1230 may include resin 1235, and a plurality of first quantum dots 1231 and a plurality of second quantum dots 1232 which are accommodated inside the resin 1235. The first quantum dots 1231 and the second quantum dots may convert absorbed incident light into a predetermined color.

The resin 1235 may absorb oxygen and moisture from the outside.

The first quantum dots 1231 may generate the converted light by absorbing the incident light. The first quantum dots 1231 may generate the converted light having a wavelength different from the wavelength of the incident light. For example, the first quantum dots 1231 may absorb the incident light having a wavelength corresponding to blue light, and may generate the converted light having a wavelength corresponding to red light.

In addition, the second quantum dots 1232 may generate the converted light by absorbing the incident light. The second quantum dots 1232 may generate the converted light having a wavelength different from the wavelength of the incident light. For example, the second quantum dots 1232 may absorb the incident light having a wavelength corresponding to blue light, and may generate the converted light having a wavelength corresponding to green light. A person of ordinary skill in the art understands and appreciates that the light generated by the light source 1210 can be a predetermined color.

The reflective pattern layer 1240 may be disposed between the light guide plate 1220 and the light conversion layer 1230. FIG. 6 shows the arrangement of the light guide plate 1220 above the reflective pattern layer 1240. However, embodiments of the inventive concept are not limited to the arrangement shown in FIG. 6.

Light emitted from the light source 1210 may be reflected by the reflective pattern layer 1240. Specifically, light emitted from the light source 1210 and then guided by the light guide plate 1220 may move forward inside the light guide plate 1220 by being reflected by a surface (e.g., an upper surface) of the reflective pattern layer 1240.

The reflective pattern layer 1240 may include metal. For example, the reflective pattern layer 1240 may include aluminum (Al). However, a material of the reflective pattern layer 1240 is not limited thereto, and the reflective pattern layer 1240 may include a material that may reflect light such as metal other than aluminum, a nitride thereof, a mixture thereof, etc. The reflective pattern may be a reflecting coating, or a reflective tape, and is not limited to a metallic construction.

The reflective pattern layer 1240 may include a plurality of holes 1245.

Light guided by the light guide plate 1220 may pass through the holes 1245 of the reflective pattern layer 1240. Specifically, light moves forward inside the light guide plate 1220 by being reflected off a surface of the light guide and reflected off the surface (e.g., the upper surface) of the reflective pattern layer 1240. As shown in FIG. 7, the light may pass through the holes 1245 of the reflective pattern layer 1240, and then may be provided to the light conversion layer 1230.

The holes 1245 of the reflective pattern layer 1240 may be arranged as a matrix form in a plan view. The holes 1245 may be disposed in a row direction and/or a column direction with a uniform distance in between. While FIG. 4 shows a non-limiting example of an arrangement of a matrix, the holes 1245 in the reflective pattern layer 1240 may be arranged differently than shown.

The reflective layer 1260 may be disposed under the light conversion layer 1230. In other words, the light conversion layer 1230 containing at least the first quantum dots 1231 and the second quantum dots 1232 within resin 1235 may be located between the reflective pattern layer 1240 and the reflective layer 1260.

With continued reference to FIG. 6, the reflective layer 1260 may reflect the converted light. Specifically, the converted light generated from the light conversion layer 1230 may be reflected by the reflective layer 1260, and then, may be provided to the display panel 1100 by passing through the holes 1245 of the reflective pattern layer 1240.

The reflective layer 1260 may include metal. For example, the reflective layer 1260 may include aluminum (Al). However, a material of the reflective layer 1260 is not limited thereto, and the reflective layer 1260 may include a material that may reflect light such as metal other than aluminum, a nitride thereof, a mixture thereof, etc. The reflective layer 1260 may also comprise a reflective non-metal coating, or a reflective tape, etc.

Figure 7:
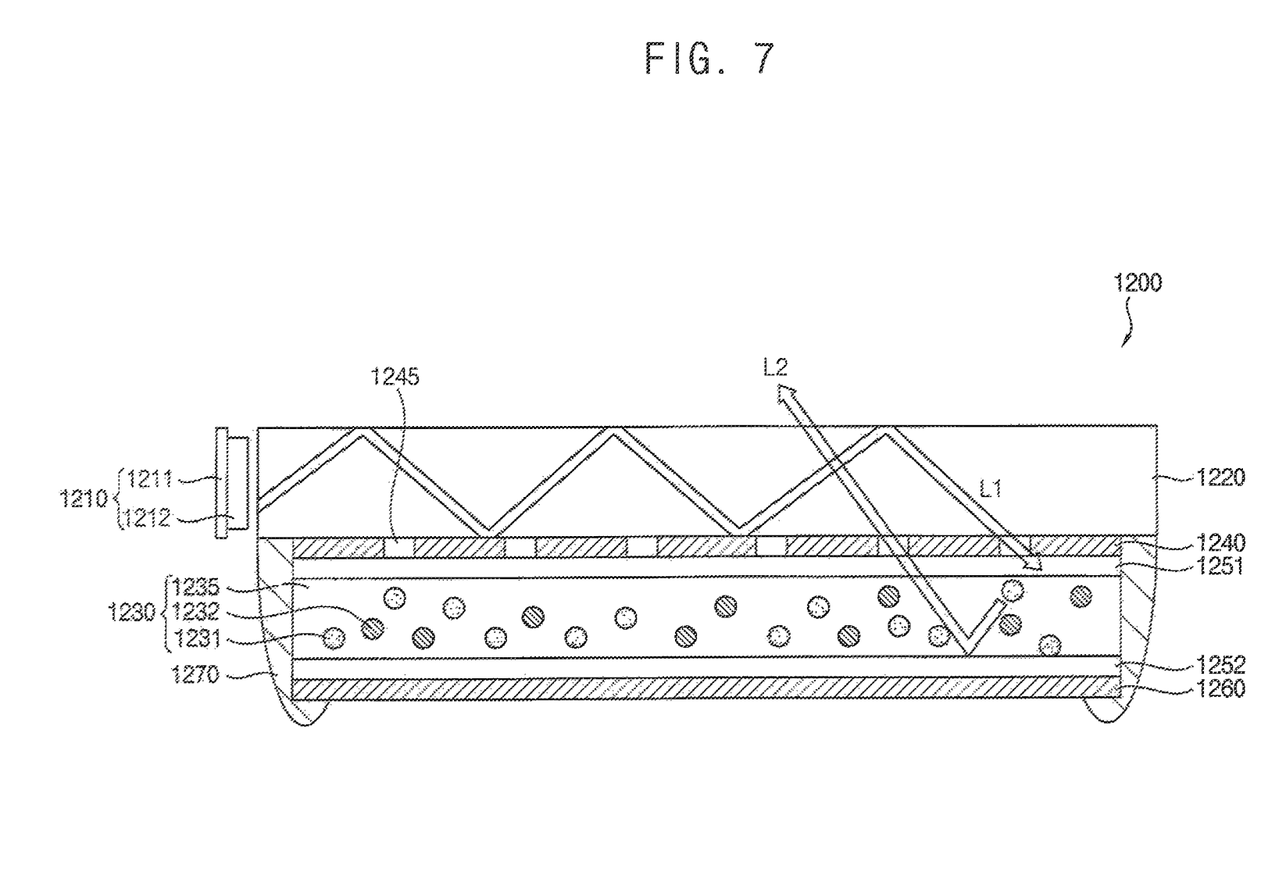
FIG. 7 is a cross-sectional view illustrating a light emission from the backlight unit in FIG. 6.

FIG. 7 is a cross-sectional view illustrating a light emission from the backlight unit in FIG. 6.

Referring to FIG. 7, a first light L1 emitted from the light source 1210 that may move forward inside the light guide plate 1220, for example by reflection off a surface of the light guide plate and alternately by a reflection off of a surface of the reflective pattern layer 1240. As shown in FIG. 7, the first light L1 may pass through one of the holes 1245 and becomes incident on a first quantum dot 1231 or a second quantum dot 1231. The light may be converted into a second light L2 at the light conversion layer 1230. The second light L2 may be reflected by the reflective layer 1260, and may be provided to the display panel 1100 located over the backlight unit 1200. As previously disclosed, the second light L2 may be a different color than the first light L1.

The first light L1 may have a first wavelength, and the first wavelength may be a wavelength corresponding to blue light. The first light L1 emitted from the light source 1210 may be guided by the light guide plate 1220, and may be provided to the light conversion layer 1230 by passing through the hole 1245 of the reflective pattern layer 1240. The first light L1 that is incident into the light conversion layer 1230 may be absorbed in the first quantum dot 1231, and the first quantum dot 1231 may convert the first light L1 into the second light L2.

The second light L2 may have a second wavelength different from the first wavelength, and the second wavelength may be a wavelength corresponding to red light. The second light L2 may move forward in a lower direction of the light conversion layer 1230, and may be reflected by the reflective layer 1260. The second light L2 reflected by the reflective layer 1260 may move forward in an upper direction of the light conversion layer 1230, and may be provided to the display panel 1100. FIG. 7 illustrates that the first light L1 is absorbed in the first quantum dot 1231. However, the present embodiment is not limited thereto, and the first light L1 may be absorbed in the second quantum dot 1232. In this case, the second light L2 may have a wavelength corresponding to green light.

In a conventional backlight unit, a light guide plate may include scattering patterns, and a low refractive layer may be disposed on the light guide plate. Light may move forward (e.g., from a first end of the light guide plate toward a second end of the light guide plate) inside the light guide plate by the low refractive layer, and the light may be provided to a display panel by the scattering patterns. However, a material forming the low refractive layer disposed on the light guide plate is relatively expensive, and the use of a low refractive layer is accompanied by an additional lamination process, etc. may be used to form the scattering patterns inside the light guide plate.

However, the backlight unit 1200 according to the present embodiment of the inventive concept may include the reflective pattern layer 1240 instead of the conventional low refractive layer, and the conventional scattering patterns may not be utilized. Accordingly, a manufacturing cost and a manufacturing time of the backlight unit 1200 may be reduced.

Referring back to FIGS. 5 and 6, the first barrier layer 1251 and the second barrier layer 1252 may be disposed on the light conversion layer 1230. The first barrier layer 1251 may be disposed between the light conversion layer 1230 and the reflective pattern layer 1240, and the second barrier layer 1252 may be disposed between the light conversion layer 1230 and the reflective layer 1260.

The first barrier layer 1251 and the second barrier layer 1252 may prevent oxygen and moisture from permeating into the light conversion layer 1230, and may protect the first quantum dots 1231 and the second quantum dots 1232 of the light conversion layer 1230.

The first barrier layer 1251 and the second barrier layer 1252 may include an inorganic material. For example, the first barrier layer 1251 and the second barrier layer 1252 may include silicon oxide ($SiO_x$). However, materials of the first barrier layer 1251 and the second barrier layer 1252 are not limited thereto, and the first barrier layer 1251 and the second barrier layer 1252 may include an inorganic material other than silicon oxide and an organic material. The inorganic material may be a desiccant.

The backlight unit 1200 may additionally include a sealing member 1270 covering a side portion of the light conversion layer 1230. Specifically, the sealing member 1270 may cover a side portion of the light conversion layer 1230, a side portion of the reflective pattern layer 1240, and a side portion of the first barrier layer 1251 and the second barrier layer 1252.

The sealing member 1270 may prevent oxygen and moisture from permeating into the light conversion layer 1230, and may protect the first quantum dots 1231 and the second quantum dots 1232 of the light conversion layer 1230.

The sealing member 1270 may include an inorganic material. For example, the sealing member 1270 may include frit. However, a material of the sealing member 1270 is not limited thereto, and the sealing member 1270 may include an organic material.

The backlight unit according to the embodiments of the inventive concept may be applied to a display device included in a computer, a notebook, a mobile phone, a smartphone, a smart pad, a PMP, a PDA, an MP3 player, or the like, just to name a few non-limiting examples.

Although the backlight units and the display devices according to the embodiments of the inventive concept have been described with reference to the drawings, the illustrated embodiments are examples, and may be modified and changed by a person having ordinary knowledge in the relevant technical field without departing from the technical spirit of the inventive concept described in the following claims.

What is claimed is:

1. A backlight unit comprising:
   a light source that emits light having a first predetermined wavelength;
   a light guide plate configured to guide light emitted from the light source;
   a light conversion layer disposed on the light guide plate; and
   a reflective pattern layer arranged between the light guide plate and the light conversion layer in which light traveling in the light guide plate is reflected by the reflective pattern layer, the reflective pattern layer including a plurality of holes, and
   wherein the light conversion layer absorbs at least a portion of the light emitted from the light source at the first predetermined wavelength and generates light having a second predetermined wavelength different than the first predetermined wavelength;
   a reflective layer, wherein the light conversion layer is disposed between the reflective pattern layer and the reflective layer;
   wherein the light conversion layer is configured to convert incident light that passes through the plurality of holes of the reflective pattern layer from the light guide plate at the first predetermined wavelength into converted light at least one of the second predetermined wavelength or a third predetermined wavelength, and wherein the converted light is reflected by the reflective layer and passes through the plurality of holes of the reflective pattern layer.

2. The backlight unit of claim 1, wherein the light guided by the light guide plate at the first predetermined wavelength passes through one or more of the plurality of holes of the reflective pattern layer, and the light having the second predetermined wavelength is output from the light conversion layer in a direction of a display panel.

3. The backlight unit of claim 1, wherein the light conversion layer comprises a plurality of quantum dots arranged in a resin.

4. The backlight unit of claim 3, wherein the plurality of quantum dots comprise at least first quantum dots and second quantum dots being respectively sized to convert the light emitted from the light source at the first predetermined wavelength that enters the light conversion layer into the second predetermined wavelength or the third predetermined wavelength, respectively.

5. The backlight unit of claim 1, wherein the plurality of holes in the reflective pattern layer are arranged as a matrix form in a plan view.

6. The backlight unit of claim 1, wherein the reflective pattern layer includes aluminum (Al).

7. The backlight unit of claim 1, further comprising a sealing member covering a side portion of the light conversion layer.

8. The backlight unit of claim 1, further comprising at least one harrier layer disposed between the light conversion layer and the reflective pattern layer.

9. A display device comprising:
a display panel configured to display an image; and
a backlight unit configured to provide light to the display panel,
wherein the backlight unit comprises:
a light source that emits light having a first predetermined wavelength;
a light guide plate configured to guide light emitted from the light source;
a light conversion layer disposed on the light guide plate that absorbs at least a portion of the light emitted from the light source at the first predetermined wavelength and generates light having a second predetermined wavelength different than the first predetermined wavelength; and
a reflective pattern layer arranged between the light guide plate and the light conversion layer, in which light traveling in the light guide plate is reflected by the reflective pattern layer, and wherein the reflective pattern layer includes a plurality of holes arranged in a pattern;
wherein the light guide plate is arranged between the display panel and the light conversion layer.

10. The display device of claim 9, wherein a least a portion of the light guided by the light guide plate passes through the plurality of holes of the reflective pattern layer and enters the light conversion layer.

11. The display device of claim 9, wherein the plurality of holes are arranged as a matrix form in a plan view.

12. The display device of claim 9, wherein the light conversion layer comprises a plurality of quantum dots arranged in a resin, and the plurality of quantum dots comprise at least first quantum dots and second quantum dots being respectively sized to convert the light emitted from the light source at the first predetermined wavelength that enters the light conversion layer into the second predetermined wavelength or a third predetermined wavelength, respectively, and wherein the converted light is provided to the display panel.

13. The display device of claim 9, wherein the backlight unit further comprises a reflective layer, and wherein the light conversion layer is arranged between the reflective pattern layer and the reflective layer.

14. The display device of claim 13, wherein the light conversion layer is configured to convert incident light that passes through one or more of the plurality of holes of the reflective pattern layer from the light guide plate and at the first predetermined wavelength that is converted into light having the second predetermined wavelength, and
wherein the converted light is reflected by the reflective layer and provided to the display panel by passing through the plurality of holes of the reflective pattern layer.

15. The display device of claim 9, wherein the backlight unit further comprises a sealing member covering a side portion of the light conversion layer.

16. The display device of claim 9, further comprising a first barrier layer disposed between the light conversion layer and the reflective pattern layer, and a second barrier layer disposed on an opposite side of the light conversion layer.

* * * * *